US006613832B2

(12) United States Patent
Friel et al.

(10) Patent No.: US 6,613,832 B2
(45) Date of Patent: Sep. 2, 2003

(54) PREMIXES AND METHOD OF PREPARING ADHESIVES AND CAULKS FROM PREMIXES

(75) Inventors: John Michael Friel, Warminster, PA (US); John William Hook, III, Warminster, PA (US); Jerry William Washel, Harleysville, PA (US); Dennis Paul Lorah, Landsdale, PA (US); James Alexander Costanzo, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 239 days.

(21) Appl. No.: 09/785,389

(22) Filed: Feb. 16, 2001

(65) Prior Publication Data

US 2002/0004551 A1 Jan. 10, 2002

Related U.S. Application Data

(60) Provisional application No. 60/183,655, filed on Feb. 18, 2000, provisional application No. 60/183,656, filed on Feb. 18, 2000, and provisional application No. 60/247,639, filed on Nov. 10, 2000.

(51) Int. Cl.$^7$ ................................................ C09C 1/36
(52) U.S. Cl. .................. 524/515; 53/415; 106/443; 106/436; 106/447; 106/281; 106/264; 106/3.1
(58) Field of Search ..................... 524/515; 53/415; 106/443, 436, 447, 281; 264/3.1

(56) References Cited

U.S. PATENT DOCUMENTS

| | | | | |
|---|---|---|---|---|
| 3,725,501 A | | 4/1973 | Hilbelink et al. ........... 260/824 |
| 3,868,263 A | * | 2/1975 | McConnaughay .......... 106/277 |
| 4,243,430 A | | 1/1981 | Sperry et al. ............... 106/308 |
| 4,403,866 A | | 9/1983 | Falcoff et al. .............. 366/138 |
| 5,078,302 A | | 1/1992 | Hellenberg ................. 222/144 |
| 5,129,551 A | | 7/1992 | Gott .......................... 222/135 |
| 5,521,234 A | | 5/1996 | Brown et al. ................. 524/44 |
| 5,527,853 A | | 6/1996 | Landy et al. ................ 524/521 |
| 5,672,649 A | * | 9/1997 | Brock et al. ................ 524/507 |
| 5,823,670 A | | 10/1998 | Rushing et al. .......... 366/152.1 |
| 5,842,641 A | | 12/1998 | Mazzalveri ................. 239/104 |
| 5,922,398 A | | 7/1999 | Hermes et al. ............. 427/137 |
| 6,013,721 A | | 1/2000 | Schall et al. ................ 524/555 |
| 6,221,145 B1 | * | 4/2001 | McClain .................... 106/443 |
| 6,308,499 B1 | | 10/2001 | Takada et al. ................ 53/415 |
| 2002/0007867 A1 | | 1/2002 | Takada et al. ................ 141/94 |

FOREIGN PATENT DOCUMENTS

| | | |
|---|---|---|
| CA | 935255 | 10/1973 |
| DE | 3910742 A1 | 10/1990 |
| EP | 0 706 543 B1 | 4/1996 |
| EP | 1094 096 A1 | 4/2001 |
| IE | 940666 | 8/1994 |
| IT | 98A000005 | 2/1998 |
| IT | 98A000005 | 8/1999 |
| WO | WO 94/25238 | 11/1994 |
| WO | WO 95/29960 | 11/1995 |
| WO | WO 98/05417 | 2/1998 |
| WO | WO 00/37568 | 6/2000 |
| WO | WO 00/44834 | 8/2000 |

OTHER PUBLICATIONS

Book: Handbook of Adhesives, ed. by Irving Skeist, 3rd ed., Van Nostrand Reihold Intl. Co., NY. 1990. See pp. 391, 607–608, 624–625 and 656–658.*
U.S. patent application Ser. No. 09/785,637, Friel et al., filed Feb. 16, 2001.
U.S. patent application Ser. No. 09/785,147, Friel et al., filed Feb. 16, 2001.
U.S. patent application Ser. No. 09/785,152, Friel et al., filed Feb. 16, 2001.
U.S. patent application Ser. No. 09/785,376, Nungesser et al., Feb. 16, 2001.
"The Answer to your Request" —Dispensing Paint System, pp. 1–18.
"The Color Bank", pp. 1–12.
Patton, "Latex Critical Pigment Volume Concentration (LCPVC)", *Paint Flow and Pigment Dispersion*, 1979, p. 193.
Forsius, "Paint Production by Component Mixing", *Faerg Lack Scand.*, 1997, 43(2), 5–6.
Dutheillet, "Integrated Solution to Build Batch Processing Plants for Blending & Formulation Industries", *Chemical Engineering World*, 1997, 32(5), 37–44.
Orcun, et al., "Scheduling of Batch Processes: An Industrial Application in Paint Industry", *Computers Chem. Enng.*, 1997, 21, S673–S678.
"Component Mixing—A New Approach to Customized Paint Production", *High Technology Finland*, 2000, 156–157.
Helander, "Benefits of delayed product differentiation", *Reprinted from PPCJ*, 1999.
Helander, "Impact of Form Postponement on Channel Members'Performance in Paint Business: A Theoretical Approach", *LTA*, 1999, p. 225–237.
International Search Report dated May 10, 2001 for PCT/US01/05307.
Dialog Search Result.

* cited by examiner

*Primary Examiner*—David W. Wu
*Assistant Examiner*—Henry S Hu
(74) *Attorney, Agent, or Firm*—Ronald D. Bakule

(57) ABSTRACT

Sets of fluid premixes useful for adhesives and caulks are provided. Also provided are methods of providing adhesive lines and a caulk lines using the sets of premixes. Further provided are ranges of adhesives and caulks based on the adhesive and caulk lines. Utilizing these methods the manufacturer, seller, or user can to adjust the adhesive or caulk at the point of manufacture, sale, or use to suit the processing and end-use conditions, in addition to the other benefits offered by delayed product differentiation.

9 Claims, No Drawings

PREMIXES AND METHOD OF PREPARING ADHESIVES AND CAULKS FROM PREMIXES

CROSS-REFERENCE TO RELATED APPLICATIONS

This application claims priority to U.S. Provisional Applications Ser. Nos. 60/183,655 filed Feb. 18, 2000, 60/183,656 filed Feb. 18, 2000, and 60/247,639 filed Nov. 10, 2000.

BACKGROUND OF THE INVENTION

FIELD OF THE INVENTION

This invention relates to sets of binder premixes methods of preparing adhesives and caulks from the sets of premixes, and to methods of preparing ranges of adhesives and caulks from sets of the premixes.

In co-pending U.S. patent applications Ser. Nos. 60/183,655; 60/183,656; and 60/247,639; we describe prepaints and method of making paints from these prepaints employing delayed product differentiation. The use of sets of premixed ingredients or raw materials as described in these applications may be extended to the preparation of adhesives.

Adhesive formulating involves selecting and admixing appropriate adhesive ingredients in the correct proportions to provide an adhesive with specific processing and handling properties, as well as the desired final dry adhesive film properties. The major ingredients of many adhesives are the binder, optional tackifier, and a fluid medium if the formulation is not presented neat, the fluid medium is, water if the adhesive is a water-borne adhesive, or solvent if the adhesive is a solvent-borne adhesive. Common optional ingredients include defoamers, coalescents, plasticizers, thickeners, rheology modifiers, solvents, driers, anti-skinning agents, surfactants, mildewcides, biocides, crosslinkers, white opacifying pigments, extender pigments, colorants, and dispersants. After the fluid adhesive is formulated and applied to a surface, the adhesive dries by evaporation of the water and/or the solvent, with or without the application of heat or radiation, and the binder forms a film containing therein the pigment and the extender particles, if any.

Formulating adhesives is complex—it is not simply a matter of mixing a few ingredients in different ratios. Rather, it involves the selection and mixing of different ingredients in different ratios depending on the type of adhesive desired. This requires manufacturers to store many different ingredients and change ingredients during manufacture depending on the specific adhesive type being prepared.

Furthermore, it requires those involved in the supply chain, and in particular, adhesive retailers, to carry a large inventory of adhesives in order to offer a range of adhesives, such as various peel levels, viscosity levels, adhesion levels, removability levels and repositionability levels.

From the perspective of number of ingredients required, formulating an adhesive is less complex than formulating an architectural paint. However, the processing and end-use applications of an adhesive may involve a broader range of conditions than are typically experienced during the application of an architectural paint. For example, an adhesive may be applied at varying shear rates depending on the processing equipment used (for example, extrusion, gravure and mayer rod type applicators, roller and die coating, and the like) and used over a broad range of temperatures (for example, from less than 0° C. in low-temperature or all-temperature applications to greater than 40° C. in some packaging applications).

Therefore, it would be desirable to make adhesives, either at a relatively large-scale industrial plant or at a relatively smaller-scale, point-of-application, point-of-sale, or point-of-use location using a limited number of ingredients, to prepare all of these different adhesives, thus, minimizing the number and type of ingredients required to make a range of adhesives. Thus, it would be useful to have a system that would permit the manufacturer, seller, or user to adjust the adhesive at the point of manufacture, sale, or application, to suit the processing and end-use conditions.

SUMMARY OF THE INVENTION

The present invention provides sets of fluid premixes binder, one or more adhesive lines, and a range of adhesives. A "fluid," as used herein, means any material that flows, including liquids, flowable powders, and viscous, amorphous solids. As used herein, premixes are "mutually compatible" if the adhesives formed by admixing the premixes do not evidence signs of colloidal instability such as flocculation. Preferably, the adhesives formed from the premixes exhibit less than 5 grams of residue, such as gel and grit, per liter of adhesive when the adhesive is passed through a 325 mesh screen, more preferably less than 1 gram of residue per liter. Preferably, the premixes exhibit less than 5 grams of residue, such as gel and grit, per liter of premix when passed through a 325 mesh screen, more preferably less than 1 gram of residue per liter of premix. If the premixes and optional additives included to enhance specific adhesive properties are fully compatible, i.e., they can be blended at any ratio without inducing colloidal instability, then they can be blended in any combination falling within the formulation space needed to achieve the desired property profile in the final adhesive. It is sufficient, however, if the premixes and optional additives can be blended at desired ratios without inducing colloidal instability to achieve the desired property profile in the range of adhesives. As used herein, "adhesive" is used in a broad sense to include all types of adhesives including neat, water-borne, and solvent-borne adhesives, including pressure sensitive adhesive and non-pressure sensitive adhesives. Pressure sensitive adhesives ("PSAs") that may be made by the method of the invention include any conventional PSAs including, without limitation, hot melt adhesives, solvent-based rubber adhesives, styrene-butadiene rubber emulsion adhesives, and acrylic adhesives. Such PSAs are employed in a number of applications, for example in tape and label applications. This definition of "adhesives" is intended to include products conventionally known as sealants, joint cements, plasters, pastes, ceramic tile adhesives, caulks, and like building adhesives.

An "adhesive line", as used herein, includes at least two different adhesives which offer properties which differ materially from each other in at least one observable property, such as adhesion to certain substrates, viscosity, removability, and repositionability. Adhesive manufacturers and retailers typically offer a range of adhesives, the range including at least two adhesive lines. By "the range including at least two adhesive lines," as used herein, is meant that the discrete elected levels of the observable property defining a first adhesive line are combined with the discrete elected levels of the observable property defining a second adhesive line, etc. to define the adhesives in the range of adhesives. For example, preparing a range of adhesives including five adhesive lines may require preparing adhesives encompassing two peel levels, two viscosity levels, two adhesion levels, two removability levels, two repositionability levels, and preferably all combinations thereof. Thus, 32 different adhesive formulations (2×2×2×2×2) may be needed. Also encompassed, however, is a range of adhesives in which a certain number of adhesive lines or premixes, including up to as high as 10–60% of the total number, are omitted, for example, for commercial reasons or for stability reasons.

A set of different, but mutually compatible, fluid adhesive binder premixes, sufficient to formulate at least one adhesive line, comprises (a) at least one premix comprising at least one polymeric binder having a peel of less than about 20 ounces/inch, a tack of less than about 300 grams, and a shear of greater than about 50 hours; (b) at least one premix comprising at least one polymeric binder having a peel of about 20 to about 50 ounces/inch, a tack of about 300 to about 500 grams, and a shear of about 5 to about 50 hours, and (c) at least one premix comprising at least one polymeric binder having a peel of greater than about 50 ounces/inch, a tack of greater than about 500 grams, and a shear of less than about 10 hours. Preferably, the number of premixes is from 3 to 15.

The present invention also provides an adhesive composition which comprises the set of premixes as set forth above, and optionally at least one additional ingredient selected from the group consisting of a tackifier, a thickener and a crosslinker.

Optionally, at least one of the premixes further comprises at least one optional additive selected from the group consisting of a tackifier, a plasticizer, a thickener and a crosslinker.

Also provided is a method of formulating at least one adhesive line, which method comprises the steps of:
(a) selecting a set of different, but mutually compatible, fluid adhesive binder premixes, comprising:
  (i) at least one premix comprising at least one polymeric binder having a peel of less than about 20 ounces/inch, a Polyken tack of less than about 300 grams and a shear of greater than about 50 hours; (ii) at least one premix comprising at least one polymeric binder having a peel of about 20 to about 50 ounces/inch, a Polyken tack of about 300 to about 500 grams, and a shear of about 5 to about 50 hours; and
  (iii) at least one premix comprising at least one polymeric binder having a peel of greater than about 50 ounces/inch, a Polyken tack of greater than about 500 grams, and a shear of less than about 10 hours; and
(b) dispensing or predetermined amount of each of the premixes into containers or applicator[s] to form the adhesive line. Preferably, the number of premixes is from 3 to 15.

Further provided is a method of providing a range of adhesives, the range comprising at least two adhesive lines, which method comprises the steps of:
(a) selecting a set of different, but mutually compatible, fluid adhesive binder premixes, which set comprises (i) at least one premix comprising at least one polymeric binder having a peel of less than about 20 ounces/inch, a Polyken tack of less than about 300 grams, and a shear of greater than about 50 hours, (ii) at least one premix comprising at least one polymeric binder having a peel of about 20 to about 50 ounces/inch, a Polyken tack of about 300 to about 500 grams, and a shear of about 5 to about 50 hours, (iii) at least one premix comprising at least one polymeric binder hav-ing a peel of greater than about 50 ounces/inch, a Polyken tack of greater than about 500 grams, and a shear of less than about 10 hours; and (iv) at least one additional different premix selected from (i), (ii), or (iii); and (b) dispensing a predetermined amount of each of the premixes into containers or applicator[s] to form the adhesive lines. Preferably, the number of premixes is from 4 to 15.

The methods herein may further comprise the step(s) of providing at least one tackifier, at least one thickener, at least one crosslinker, or combinations thereof. Predetermined amounts of the tackifier, the thickener; and or crosslinker are dispensed into containers or the applicator(s).

Also provided is a different set of premixes sufficient to form at least one different adhesive line, which set comprises at least two different, but mutually compatible, fluid adhesive binder premixes selected from the group consisting of (a) at least one premix comprising at least one curable prepolymer that forms a polymeric binder that has a Tg of about −70° C. to about 0° C. when cured; (b) at least one fluid premix comprising at least one curable prepolymer that forms a polymeric binder which has a Tg of about −10° C. to about 70° C. when cured; (c) at least one premix comprising at least one polymeric binder which has a Tg of about 0° C. to about 30° C.; (d) at least one premix comprising at least one polymeric binder which has a Tg of about −15° C. to about 15° C.; and (e) at least one premix comprising at least one polymeric binder which has a Tg of about −70° C. to about 0° C.

Also provided is a method of providing at least one adhesive line, which method comprises the steps of (a) providing a set of different, but mutually compatible, fluid adhesive binder premixes comprising at least two premixes selected from the group consisting of (i) at least one premix comprising at least one curable prepolymer that has a Tg of about −70° C. to about 0° C. when cured; (ii) at least one premix comprising at least one curable prepolymer that has a Tg of about −10° C. to about 70° C. when cured; (iii) at least one premix comprising at least one polymeric binder having a Tg of about 0° C. to about 30° C.; (iv) at least one premix comprising at least one polymeric binder having a Tg of about −15° C. to about 15° C.; and (v) at least one premix comprising at least one polymeric binder having a Tg of about −70° C. to about 0° C.; and (b) dispensing a predetermined amount of each of the premixes into containers or an applicator to form the one adhesive line.

Further provided is a method of providing a range of adhesives, the range comprising at least two adhesive lines, which method comprises the steps of: (a) providing a set of different, but mutually compatible, fluid adhesive binder premixes comprising at least three premixes selected from the group consisting of (i) at least one premix comprising at least one curable prepolymer that has a Tg of about −70° C. to about 0° C. when cured; (ii) at least one premix comprising at least one curable prepolymer that has a Tg of about −10° C. to about 70° C. when cured; (iii) at least one premix comprising at least one polymeric binder having a Tg of about 0° C. to about 30° C.; (iv) at least one premix comprising at least one polymeric binder having a Tg of about −15° C. to about 15° C.; (v) at least one premix comprising at least one polymeric binder having a Tg of about −70° C. to about 0° C.; and (vi) at least one additional different premix selected from premixes (i), (ii), (iii), (iv), and (v); or (b) dispensing a predetermined amount of each of the premixes into containers or applicators to form the adhesive lines.

The methods herein may further comprising the step(s) of adding materials that enhance the application or final performance of the adhesive, such as tackifiers, plasticizers, thickeners, crosslinkers, and mixtures thereof.

Caulks are like adhesives and sealants in that they are based on soft polymers. Many caulks are also like paint in that they can be filled with pigment and extender. Caulks are differentiated by their higher solids content and higher viscosity and their use to fill and seal cracks, joints, and the like.

If one adhesive line is desired, i.e., if one key property is to be varied (for example, peel, viscosity, adhesion, removability, or repositionability), then the complete adhesive line can be made from one each of premixes (i), (ii), and (iii) which are described above or alternatively from at least two of (a) to (e) which are described above.

If a range of adhesives including two adhesives lines is desired, i.e., if two key properties are varied (for example, two properties selected from peel, viscosity, adhesion, removability, and repositionability), then the range of adhesives may be made from at least one each of premixes (i) to (iii) and least one additional, premixes but different selected from premixes (i) to (iii) or alternatively, from at least two of premixes (a) to (e) described above and at least one additional different premix selected from premixes (a) to (e) described above depending on which key properties are to be varied.

If a range of adhesives including three adhesive lines is desired, i.e., if three key properties are to be varied (for example, three properties selected from peel, viscosity, adhesion, removability, and repositionability), then the range of adhesives can be made from at least one each of premix (i), premix (ii), and premix (iii) and at least two additional different premixes selected from (i), (ii), or (iii) or alternatively at least one each of premixes (a) to (e) and at least two additional different premixes selected from (a) to (e), depending on which key properties are to be varied.

If a range of adhesives including four adhesive lines is desired, i.e., if four key properties are to be varied (for example, four properties selected from peel, viscosity, adhesion, removability and repositionability), then the range of adhesives can be made from at least one each of premix (i), premix (ii), and premix (iii) and at least three additional different premixes selected from (i) to (iii), depending on which key properties are to be varied.

This technique may be continued to vary as many additional key properties as desired.

By "additional premix selected from the group consisting of (i), (ii), and (iii)" is meant an adhesive binder premix which is different from adhesive premixes (i), (ii), or (iii), respectively, but which otherwise meets the limitations associated with premixes (i), (ii), and (iii). By "additional premixes selected from the group consisting of (a), (b), (c), (d), and (e)" is meant herein an adhesive binder premix different from premix (a), (b), (c), (d), or (e), respectively, but otherwise meeting the limitations associated with premix (a), (b), (c), (d) and (e).

In each of the above embodiments, the premixes are selected to cover a wide formulation space so that the desired final adhesive properties lie within the blend space defined by the premixes at the extremes. In many cases, the premixes will not themselves be practical adhesives, but by pushing the premixes to these extremes one can maximize the blend space available for the adhesive system. When the premixes, additives, and colorants are all fully compatible, they can be blended at the desired ratios to achieve the desired adhesive line(s) and range of adhesives without inducing colloidal instability.

This technique is similar to the design principles used in statistical experimental design and analysis of mixture component designs; however, instead of designing a mixture space to explore the response surface within it, one is designing the boundaries of the mixture space to maximize the flexibility of the adhesive system. The key to success is to have mutual compatibility of the individual ingredients and premixes across the mixture space.

Adhesive properties can be predicted in a number of ways. One approach is to develop response surface models of the blend space using standard Mixture Component experimental design statistical tools. These simple statistical models can then be used by a linear optimization program, by a massive grid search, or by a graphical analysis tool. Another approach is to simply use empirical methods to determine which blends are needed for specific adhesive lines and then incorporate those simple empirical recipes in the adhesive-making machine software.

An extension of this techniques is to have the adhesive machine automatically pretest certain key properties (e.g., viscosity, adhesion to certain substrates, peel, tack, shear) and make minor adjustments during the formulating of the adhesives from the premixes. Having feedback loops in the adhesive machine can provide more precise matching of color, adhesion, peel strength, tack, shear strength, and viscosity targets.

It is preferred that the all fluid premixes employed herein have the same or similar viscosities to aid in mixing. Viscosity fluctuation in the final adhesive formulation is expected to be reduced because of the prior equilibration of ingredients in the premixes.

The premixes are formulated to maximize the flexibility of adhesive manufacturing. Rather than purchasing individual adhesive ingredients, adhesive manufacturers, and even buyers at point-of-sale and point-of-use (home improvement stores, building product departments, and contractors), can purchase the set of premixes needed to prepare a desired range of adhesives. These sets of premixes will contain at least one each of premixes (i), (ii) and (iii) and possibly additional premixes depending upon the formulating flexibility desired. Optionally, the above premixes are mixed with an additional premix which includes at least one colorant such as a colored pigment or dye.

The sets and methods of the invention can be used for caulks.

Binder selection is a major factor in producing a caulk that has the desired set of properties. Those skilled in the art readily recognize that binder characteristics such as solids level, monomer selection, molecular weight, Tg modules and many other factors influence the properties of the caulk. Those skilled in the art also qualitatively recognize how to control these characteristics to obtain the desired caulk properties. Such properties include the balance between tensile strength vs. elongation/flexibility, adhesion, surface tack, channel cracking, clarity, yellowing, shrinkage, and cost. While a quantitative relationship between binder characteristics and properties is difficult to obtain, those skilled in the art can readily select appropriate binders for use in the binder premixes to produce desired caulk properties.

In the caulk embodiment, the set comprises (a) at least one caulk binder premix comprising at least one polymeric binder which has a Tg of less than about 0° C.; (b) at least one binder premix comprising at least one polymeric binder which has a Tg of less than about 25° C.; and (c) optionally, at least one extender premix comprising at least one extender; wherein the premixes have a solids content of at least about 50% by weight.

Also provided is a method of forming at least one caulk line, which method comprises the steps of:

(a) providing a set of different, but mutually compatible, fluid caulk binder premixes sufficient to form at least one caulk line, which set comprises (i) at least one binder premix comprising at least one polymeric binder which has a Tg of less than about 0° C.; (ii) at least one binder premix comprising at least one polymeric binder which has a Tg of less than 25° C.; and (iii) optionally, at least one extender premix comprising at least one extender; wherein the premixes have a solids content at the least about 50% by weight; and (b) dispensing a predetermined amount of each premix into containers or applicator(s) to form at least one caulk line.

The extender premix may further comprise at least one opacifying pigment. Alternatively or additionally, the set of caulk premixes may further comprise at least one fluid mutually compatible premix, comprising at least one opacifying pigment.

The methods herein may further comprise the step of mixing the adhesive or caulk binder premixes before, while, or after they are dispensed into the containers. The methods may further comprise the step of mixing these premixes before or while they are dispensed into the applicator(s). The methods may further include the step of adjusting the viscosity of these premixes before, while, or after they are dispensed into the containers or before or while they are dispensed into the applicator(s). The methods herein may be carried out continuously at a manufacturing facility, at a distributor, at a point-of-sale, or at a point-of-use. In addition, the methods may be controlled by a computer. By "additional premixes ["a", "b", or "c"] is meant a caulk premix different from the caulk binder premixes (a) and (b) and the caulk extender premix (c), respectively, but otherwise meeting the limitations associated with the caulk premixes (a), (b) and (c).

While exemplified with a pressure sensitive adhesive and a caulk, the present methods are not limited to preparing only pressure sensitive adhesive or caulks per se but may also be extended to the preparation of any water-borne or solvent-borne adhesive, sealant, caulk or related building product. The industries and the market segments where adhesives and related products produced by the present methods can be used include adhesives used for construction, primary wood bonding, furniture, land transportation-OEM, automotive aftermarket, aerospace, electrical/electronic, appliances, packaging, bookbinding, textile, footwear, pressure-sensitive abrasives, friction materials, foundry, consumer, aerosol, medical, dental, miscellaneous product assembly, and the like.

DETAILED DESCRIPTION OF THE INVENTION

The premixes herein each contain a polymeric binder having specific properties. Polymeric binders are polymers or prepolymers which form the primary film of the adhesive. Binders bind the pigment, if present, and/or extenders and provide the required adhesive flow. The binders selected for the premix will depend upon the final use of the formulated adhesive.

Suitable polymeric binders include water-borne and solvent-borne natural and synthetic polymers, including but not limited to, homopolymers, copolymers or terpolymers such as acrylic and/or methacrylic polymers, polyvinyl acetate, polyvinyl alcohol, styrene-acrylic copolymers, styrene-butadiene copolymers, vinyl acetate-acrylic copolymers, ethylene-vinyl acetate copolymers, vinyl acetate-vinyl versatate copolymers, vinyl acetate-vinyl maleate copolymers, vinyl acetate-vinyl chloride-acrylic terpolymers, ethylene-vinyl acetate-acrylic terpolymers, polyurethane, polyvinyl butyral, structural acrylic polymers, anaerobic, cyanoacrylate polymers, polyvinyl chloride, polyvinylidene chloride, polyethylene, ethylene-vinyl acetate copolymers, polypropylene, ethylene/acrylic acid copolymer, ethylene/methyl acrylate copolymers, irradiated polyethylene, polyamide, polyester, epoxy, phenolic, amino, furan, polyimides, natural rubber, styrene copolymers and terpolymers, non-block, styrenic block copolymers, neoprene, nitrile rubber, butylene, polybutene, ethylene-propylene-diene rubbers, rubber silicone, animal glue, caseins, starch and wheat flours, dextrins, cellulose, bitumen, rosin, lignin, silicate, styrene-butadiene rubber, styrene-butadiene, acrylonitrile-butadiene-styrene, halodiene, and the like. The polymers or prepolymers may optionally contain up to about 10% by weight of a functional monomer, for example, but not limited to, carboxylic acid, phosphate, sulfate, sulfonate, and amide monomers and combinations thereof, non-functional monomers, and mixtures thereof. The polymeric binders are preferably waterborne latex polymers.

With the premixes, it is optional to include minor amounts, i.e., less than about 20% by weight, based on the total weight of the premixes, of conventional adhesive additives such as tackifiers, plasticizers, crosslinkers, thickeners, acids, bases, defoamers, coalescents, cosolvents, dispersing resins, mildewcides, biocides, antifreeze agents, opacifying pigments, extender pigments, colorants, glass and polymeric beads and the like. These additives must be compatible with the other adhesive ingredients in the premix and the premixes employed in formulating the adhesive lines. These optional ingredients may be added separately or added to the premixes. In the examples, the tackifier, crosslinker, and/or thickener are included as separate ingredients rather than being incorporated into the premixes.

The properties of tack, peel strength, and shear resistance, which are frequently mutually exclusive properties, may be highly important in tailoring an adhesive composition that is suitable for a particular application. Tack is generally a measure of viscous flow under conditions of fast strain rates and low stress magnitudes. Peel strength is a measure of resistance to flow at intermediate strain rates and moderate to high stress magnitudes, as well as the cohesive strength of the adhesive. Shear resistance is a measure of resistance to flow at intermediate stress magnitudes.

Polymeric additives, such as tackifiers and plasticizers, may be added to modify the properties of the adhesive including, for example, the viscoelastic behavior of the finished adhesive. The particular polymeric additive selected may vary depending, for example, on the adhesive involved and the modification sought.

Generally speaking, to enhance the performance characteristics of the adhesive the tackifier should possess a certain range of properties with respect to the adhesive to which it is added. For example, the tackifier should generally have a lower molecular weight than the polymer of the adhesive. In addition, the tackifier should generally have a glass transition temperature ($T_g$) higher than that of the adhesive's polymer. The softening temperature of the tackifier should generally be higher than that of the adhesive's polymer, and the tackifier should generally have a minimum degree of compatibility with the adhesive's polymer. Suitable tackifiers include dispersed and solid grade tackifiers such as rosin esters, rosin acids, and hydrocarbon resins including aliphatic and aromatic resins', and the like.

Plasticizers may be added to an adhesive composition, for example, to increase its workability, flexibility, and/or distensibility. They are molecules that are smaller than the polymeric binder molecules present in the adhesive system. Depending upon the involved adhesive system, the addition of a plasticizer may lower the melt viscosity, elastic modulus, and glass transition temperature ($T_g$) of the overall system. Plasticizers may also be added to polymer formulations to increase flexibility by promoting bond formation between the polymer molecules and the plasticizer rather than between the polymer molecules themselves. The plasticizer molecules separate the larger polymeric chains of the binder and reduce the attractive forces between them and act as a lubricant. In doing so, the plasticizer may also increase the specific volume and change the index of refraction of the resulting adhesive composition. The addition of the plasticizer may also increase the viscosity of the adhesive composition.

Suitable crosslinkers include multivalent metal such as zinc, magnesium, aluminum, calcium, iron, zirconium, and the like.

Suitable opacifying pigments include titanium dioxide ($TiO_2$) or a combination of titanium dioxide and auxiliary hiding pigments such as voided latex polymer particles, zinc oxide, lead oxide, synthetic polymer pigments, and mixtures thereof. Rutile and anatase grades of titanium dioxide are suitable for use herein. Rutile titanium dioxide is preferred. The surface of these titanium dioxides may be treated with various organic and/or inorganic surface treatments, e.g., as the oxides of silica, alumina, and zirconia. Fumed titanium dioxide is also useful herein.

The voided latex particles useful herein have a particle size diameter of about 100 nm to about 2,500 nm and a void fraction of about 10% to about 75%. Preferably, the voided latex particles have a particle size of about 500 nm to about 1,100 nm. The voided latex particles have at least one void but may have multiple voids, non-spherical voids, interconnected voids, voids having channels connected to the outside of the particles, and structures described as vesiculated and sponge-like. Preferably, they have a single void. The voided latex particles have a glass transition temperature (Tg) of at least about 20° C. preferably at least about 50° C. The higher the glass transition temperature, the harder the particle is and the less likely it is to collapse. If the voided latex particles collapse, they are unable to contribute to hiding. The voided latex particles may be prepared by conventional polymerization processes known in the art, such as those disclosed in U.S. Pat. Nos. 3,784,391, 4,798,691, 4,908,271, 4,972,000, 5,041,464, 5,157,084, 5,216,044 and 6,020,435, as well as Japanese Patent Applications 60/223,873, 61/62510, 61/66710, 61/86941, 62/127336, 62/156387, 01/185311, and 02/140272. Preferably, the voided latex particles are prepared according to U.S. Pat. Nos. 4,427,836, 4,469,825, 4,594,363, 4,880,842, 5,494,971 and 6,020,435.

Suitable extender pigments for use herein include barium sulfate (about 1 to about 15 microns), Blanc Fixe (about 0.5 to about 5 microns), calcium carbonate (about 0.05 to about 35 microns), silica (about 0.001 to about 14 microns), magnesium silicate (about 0.5 to about 15 microns), aluminum silicate (about 0.2 to about 5 microns), mica, bentonite, magnesium alumino-silicate, fumed alumina, colloidal attapulgite, synthetic amorphous sodium alumino-silicate, sodium potassium alumino-silicate, and the like.

Thickener is a general term which includes any material added to an adhesive to modify its Theological profile.

Preferred thickeners are associative thickeners. Suitable thickeners for use herein include polyvinyl alcohol (PVA), hydrophobically-modified, alkali-soluble emulsions known in the art as HASE emulsions, alkali-soluble or alkali swellable emulsions known in the art as ASE emulsions, hydrophobically-modified ethylene oxide-urethane polymers known in the art as HEUR thickeners, and cellulosic thickeners such as hydroxymethyl cellulose (HMC), hydroxyethyl cellulose (HEC), hydrophobically-modified hydroxyethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, and the like. Also useful as thickeners are fumed silica, attapulgite clay and other types of clay, titanate chelating agents, and the like.

Suitable dispersants for use herein include non-ionic, anionic, and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like. Anionic polymers such as homopolymers and copolymers based on polycarboxylic acids, including those that have been hydrophobically-modified or hydrophilically-modified, e.g., polyacrylic acid or polymethacrylic acid or maleic anhydride with various monomers such as styrene, acrylate or methacrylate, diisobutylene, and other hydrophilic or hydrophobic comonomers are also suitable for use as dispersants, further including the salts of the aforementioned dispersants, and mixtures thereof.

Suitable defoamers include acetylenic diols, silicone-based and mineral oil-based defoamers, and the like.

Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable surfactants include cationic, anionic, and non-ionic surfactants.

In order to minimize the number of adhesive ingredients needed to prepare a range of adhesives, one needs to consider the extremes of the key properties required for the range of adhesives and formulate adhesive premixes which are capable of being blended in various combinations to provide the key properties required at the extreme values and at intermediate points as well. Specific properties may also be improved by including adhesive additives which enhance the desired property.

All ranges disclosed herein are inclusive and the minimums and maximums of the nested ranges are combinable. The measurement of tack is made in accordance with PSTC Standard Tack Test at a rate of 12 inches/minute. The measurement of peel is made in accordance with PSTC Standard Peel Test on a Polyken tester. The measurement of shear is made on a test sample with a 1 square inch overlap with a 1 kg weight under static shear at a temperature of 55–80□F. All of the above measurements are made using a coating thickness of 0.9–1.1 mils. The glass transition temperature ("Tg") is measured via differential scanning calorimetry at a rate of 20° C./minute.

EXAMPLES

Example 1

Preparation of Adhesive Binder Premixes

Premix 1 is prepared by mixing 100 grams of an acrylic pressure sensitive polymer (N-619 available from Rohm and Haas Company, Philadelphia, Pa.) with 0.5 grams of a standard commercial non-ionic or anionic wetting agent, 1.0 grams of an ethoxylated phenol mechanical stabilizer, and 0.5 grams of a standard defoamer. The pH is adjusted to above 8.0 with ammonia.

Premix 2 is prepared by mixing 100 grams of an acrylic pressure sensitive polymer (N-580 available from Rohm and Haas Company, Philadelphia, Pa.) with 0.5 grams of a standard commercial non-ionic or anionic wetting agent, 1.0 gram of an ethoxylated phenol mechanical stabilizer, and 0.5 grams of a standard defoamer. The pH is adjusted to above 8.0 with ammonia.

Premix 3 is prepared by mixing 100 grams of an acrylic pressure sensitive polymer (N-1031 available from Rohm and Haas Company, Philadelphia, Pa.) with 0.5 grams of a standard commercial non-ionic or anionic wetting agent, 1.0 grams of an ethoxylated phenol mechanical stabilizer, and 0.5 grams of a standard defoamer. The pH is adjusted to above 8.0 with ammonia.

Example 2

Preparation of Adhesives

Binders 1, 2, and 3 may be combined in various ratios along with various levels of dispersed tackifier and crosslinker to produce adhesives having characteristics suitable for pressure sensitive applications such as tape and label applications pressure sensitive adhesives (PSAs). The adhesives having low viscosities can be applied via gravure and Mayer rod-type applicators. The adhesives having higher viscosities are suitable for roller and die coaters.

The thickener is a HASE thickener (Acrysol TT-615 available from Rohm and Haas Company, Philadelphia, Pa.). The tackifier is a dispersed rosin ester, rosin acid, or a hydrocarbon. The crosslinker is multivalent metallic type.

The formulation of the adhesive premixes is shown in the following table. The ingredient levels are in grams.

A first binder premix contains a soft acrylic binder having a Tg of −50° C. (Rhoplex 1950, available from Rohm and Haas Company, Philadelphia, Pa.). The solids content of the binder is about 62–65% The soft acrylic binder is formulated with caulk additives well known to those skilled in the art, such as glycols, surfactants, preservatives, mildewcides, defoamers, and optional additives, such as, silanes for adhesion.

A second binder premix contains a polymeric binder that is a lower cost, vinyl or vinyl/acrylic binder having a Tg of −9° C. (Rovace 86, available from Rohm and Haas Company, Philadelphia, Pa.) and solids content of about 55%. It is formulated into a lower cost premix by using a plasticizer to further reduce the Tg and other caulk additives such as those used in the above acrylic binder.

An extender premix is prepared by grinding calcium carbonate and titanium dioxide in water with a dispersant and a thickener which are selected to produce a stable premix. This premix should be prepared at as high a solids content as possible to reduce the amount of water introduced into the caulk. The resulting caulk will shrink less when used to fill a space. Because of this, solid pigment and or filler can be utilized to further increase the solids of the caulk. The caulk will require mixing or milling techniques capable of handling its high viscosity.

An additive premix containing a solid-grade of hydroxy ethyl cellulose (Natrosol 2500MXR, Hercules, Inc., Wilmington, Del.) is prepared for use as a thickener.

Example 4

Preparation of Caulks

A caulk is prepared by blending one or both the binder premixes with the extender premix. The additive premix is then added and the resulting mixture is milled or mixed in an a Sigma mill or Hockmeyer Mixer (Hockmeyer Equipment Corp., Elizabeth City, N.C.). Optionally, the mill or mixer can contain a feed screw that fills caulk tubes, thus

| | Adhesive Type | | | | | | | | | | | |
|---|---|---|---|---|---|---|---|---|---|---|---|---|
| Ingredients | Polyolefin Adhesion** | Polyolefin Adhesion | General Purpose Low Peel | General Purpose Low Peel | General Purpose High Peel*** | General Purpose High Peel | Repositionable | Repositionable | Removable Low Peel | Removable Low Peel | Removable High Peel | Removable High Peel |
| Premix 1 | 50–60 | 50–60 | — | — | 70–80 | 70–80 | 20–30 | 20–30 | — | — | 10 to 20 | 10 to 20 |
| Premix 2 | — | — | 40–50 | 40–50 | — | — | 70–80 | 70–80 | 10 to 20 | 10 to 20 | — | — |
| Premix 3 | 5 to 20 | 5 to 20 | 40–50 | 40–50 | — | — | — | — | 80 to 90 | 80 to 90 | 80–90 | 80–90 |
| Thickener | — | 1 to 1.5 | — | 1 to 1.5 | — | 1 to 1.5 | — | 1 to 1.5 | — | 1 to 1.5 | — | 1 to 1.5 |
| Tackifier | 20–30** | 20–30 | 5 to 10 | 5 to 10 | 20–30*** | 20–30 | — | 1 to 1.5 | — | — | — | — |
| Crosslinker | — | — | — | — | — | — | 1 to 2 | 1 to 2 | 1 to 2 | 1 to 2 | 1 to 2 | 1 to 2 |
| Comments | Adhesion to polyolefin surfaces, **range will result in moderate to high adhesion | Higher viscosity coaters | Results may range from low to moderate adhesion for label applications | Higher viscosity coaters | High adhesion/ surface dependent ***range will result in moderate to high adhesion | Higher viscosity coaters | Label PSA having short term removability leading to permanent adhesion | Higher viscosity coaters | Various removability on different surfaces | Higher viscosity coaters | Higher adhesion and removability on different surfaces | Higher viscosity coaters |

Example 3

Preparation of Caulk Premixes

The following premixes are useful for formulating a line of caulks.

creating a continuous process for the production of the caulk. Utilizing the method of the invention, this continuous production of caulks could provide a line of caulks on demand.

The four premixes described above are used to produce a line of caulks by combining them in different proportions. For example, utilizing the first binder premix, the extender premix, and additive premix, a high quality caulk can be produced. Several grades of this caulk can be provided by using different amounts of the extender premix. In an analogous fashion, the second binder premix may be used to produce several lower quality/lower cost caulks. Further or alternative variations in caulk quality and properties can be achieved by using combinations of the first and second binder premixes along with the extender premix, and the additive premix (i.e., thickener). Excluding the extender premix produces a clear caulk. Using one or both of the binder premixes results in a quality range of clear caulks.

Many variations of this example are possible. The filler and pigment can be provided in the form of separate premixes and their ratio and level can be controlled so that properties such as adhesion and surface tack can be varied. Caulks with little or no titanium dioxide can be tinted or colored with other pigments. Thickeners that require neutralization with base can be utilized, including, for example, a hydrophobically-modified, alkali-swellable emulsion such as Acrysol™ TT-615 (available from Rohm and Haas Company, Philadelphia, Pa.). When such a thickener is used a base such as ammonium or sodium hydroxide may be added during the mixing or milling of the caulk. Mixtures of thickeners may be used. Many other caulk additives, such as fumed silica, flash rust inhibitors, zinc complex, hindered amine light stabilizers and the like may be employed in the various premixes.

What is claimed is:

1. A set of different, but mutually compatible, fluid binder premixes sufficient to form at least one adhesive line, the set comprising:

(i) at least one premix which comprises at least one polymeric binder having a peel of less than about 20 ounces/inch; a tack of less than about 300 grams; and a shear of greater than about 50 hours;

(ii) at least one premix which comprises at least one polymeric binder having a peel of about 20 to about 50 ounces/inch, a tack of about 300 to about 500 grams, and a shear of about 5 to about 50 hours; and (iii) at least one premix which comprises at least one polymeric binder having a peel of greater than about 50 ounces/inch, a tack of greater than about 500 grams, and a shear of less than about 10 hours.

2. An adhesive comprising the set of premixes of claim 1 and at least one additive selected from the group consisting of a tackifier, a plasticizer, a thickener, a crosslinker, and mixtures thereof.

3. The set of premixes of claim 1, wherein the number of premixes is from 3 to 15.

4. The set of premixes of claim 1, wherein at least one of the premixes further comprises at least one additive selected from the group consisting of a tackifier, a plasticizer, a thickener, and a crosslinker.

5. A set of different, but mutually compatible, fluid binder premixes sufficient to form at least one adhesive line, which set comprises at least two premixes selected from the group consisting of:

(a) at least one premix comprising at least one prepolymer that forms a polymeric binder having a Tg of about −70° C. to about 0° C. when cured;

(b) at least one premix comprising at least one prepolymer that forms a polymeric binder having a Tg of about −10° C. to about 70° C. when cured;

(c) at least one premix comprising at least one polymeric binder having a Tg of about 0° C. to about 30° C.

(d) at least one premix comprising at least one polymeric binder having a Tg of about −15° C. to about 15° C.; and (e) at least one premix comprising at least one polymeric binder having a Tg of about −70° C. to about 0° C.

6. A set of different, but mutually compatible, fluid premixes sufficient to form at least one caulk line, which set comprises:

(i) at least one binder premix comprising at least one polymeric binder having a Tg of less than about 0° C.;

(ii) at least one binder premix comprising at least one polymeric binder, having a Tg of less than about 25° C.; and (iii) optionally at least one extender premix comprising at least one extender.

7. The set of premixes of claim 6, which set further comprises at least one additional fluid binder premix or fluid extender premix.

8. The set of premixes of claim 7, wherein the fluid extender premix further comprises at least one opacifying pigment.

9. The set of premixes of claim 6, further comprising at least one fluid opacifying premix comprising at least one opacifying pigment.

* * * * *